(12) United States Patent
Willats et al.

(10) Patent No.: US 10,648,394 B2
(45) Date of Patent: May 12, 2020

(54) HEAT SHIELD WITH INSULATED DOSER AND SENSOR MOUNT AREAS FOR A VEHICLE EXHAUST COMPONENT

(71) Applicant: Faurecia Emissions Control Technologies, USA, LLC, Columbus, IN (US)

(72) Inventors: Robin Willats, Columbus, IN (US); Jerome Brian Hornback, Indianapolis, IN (US); Jeffery Warren Prairie, Franklin, IN (US); John G. Rohde, Columbus, IN (US); Thibaut Contremoulins, Belfort (FR); Maria Saur, Augsburg (DE)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/085,302

(22) PCT Filed: Mar. 23, 2017

(86) PCT No.: PCT/US2017/023720
§ 371 (c)(1),
(2) Date: Sep. 14, 2018

(87) PCT Pub. No.: WO2017/165590
PCT Pub. Date: Sep. 28, 2017

(65) Prior Publication Data
US 2019/0101041 A1  Apr. 4, 2019

Related U.S. Application Data

(60) Provisional application No. 62/312,541, filed on Mar. 24, 2016.

(51) Int. Cl.
*F01N 13/14* (2010.01)
*F01N 3/20* (2006.01)
(Continued)

(52) U.S. Cl.
CPC ......... *F01N 13/141* (2013.01); *B01D 53/944* (2013.01); *B01D 53/9418* (2013.01);
(Continued)

(58) Field of Classification Search
CPC ...... F01N 3/029; F01N 3/0293; F01N 13/141; F01N 13/143
See application file for complete search history.

(56) References Cited

U.S. PATENT DOCUMENTS 5,882,608 A  3/1999 Sanocki et al.
6,041,595 A  3/2000 Halimi et al.
(Continued)

FOREIGN PATENT DOCUMENTS

DE  202014104869 U1  1/2016
EP       2703614 A1   3/2014
(Continued)

OTHER PUBLICATIONS

International Search Report and Written Opinion for PCT/US2017/023713, dated Jun. 28, 2017.
(Continued)

*Primary Examiner* — Jonathan R Matthias
(74) *Attorney, Agent, or Firm* — Carlson, Gaskey & Olds, P.C.

(57) ABSTRACT

An exhaust component assembly includes a housing having at least one mount area configured to be attached to another exhaust component. A primary heat shield is attached to the housing and includes at least one open area at the mount area. A secondary heat shield positioned adjacent to the primary heat shield to at least partially cover the mount area. A method of assembling the primary and secondary heat shields to the housing of the exhaust component assembly is also disclosed.

27 Claims, 11 Drawing Sheets

(51) Int. Cl.
*F01N 3/28* (2006.01)
*F01N 13/18* (2010.01)
*B01D 53/94* (2006.01)
*F01N 13/16* (2010.01)

(52) U.S. Cl.
CPC ....... *B01D 53/9477* (2013.01); *F01N 3/2066* (2013.01); *F01N 3/2892* (2013.01); *F01N 13/148* (2013.01); *F01N 13/16* (2013.01); *F01N 13/1805* (2013.01); *F01N 2240/20* (2013.01); *F01N 2260/20* (2013.01); *F01N 2610/02* (2013.01); *F01N 2610/1453* (2013.01); *Y02A 50/2325* (2018.01); *Y02T 10/24* (2013.01)

(56) References Cited

U.S. PATENT DOCUMENTS

| | | | |
|---|---|---|---|
| 6,438,949 | B1 | 9/2002 | Nozaki |
| 7,976,788 | B2 | 7/2011 | Drost et al. |
| 8,951,323 | B2 | 2/2015 | Kumar |
| 2006/0065480 | A1 | 3/2006 | Leehaug |
| 2013/0145820 | A1* | 6/2013 | Boahene ............... F01N 13/008 73/23.31 |
| 2014/0196442 | A1 | 7/2014 | Katou et al. |
| 2014/0237998 | A1* | 8/2014 | Fahrenkrug ........... F01N 3/2066 60/301 |
| 2014/0342115 | A1 | 11/2014 | Sakane et al. |
| 2015/0260075 | A1 | 9/2015 | Schweiggart |

FOREIGN PATENT DOCUMENTS

| | | |
|---|---|---|
| JP | 2006009693 A | 1/2006 |
| JP | 2007162570 A | 6/2007 |
| WO | 2015012829 A1 | 1/2015 |

OTHER PUBLICATIONS

International Search Report and Written Opinion for PCT/US2017/023715, dated Jun. 28, 2017.

International Search Report and Written Opinion for PCT/US2017/023717, dated Jun. 28, 2017.

International Search Report and Written Opinion for PCT/US2017/023720, dated Jun. 28, 2017.

* cited by examiner

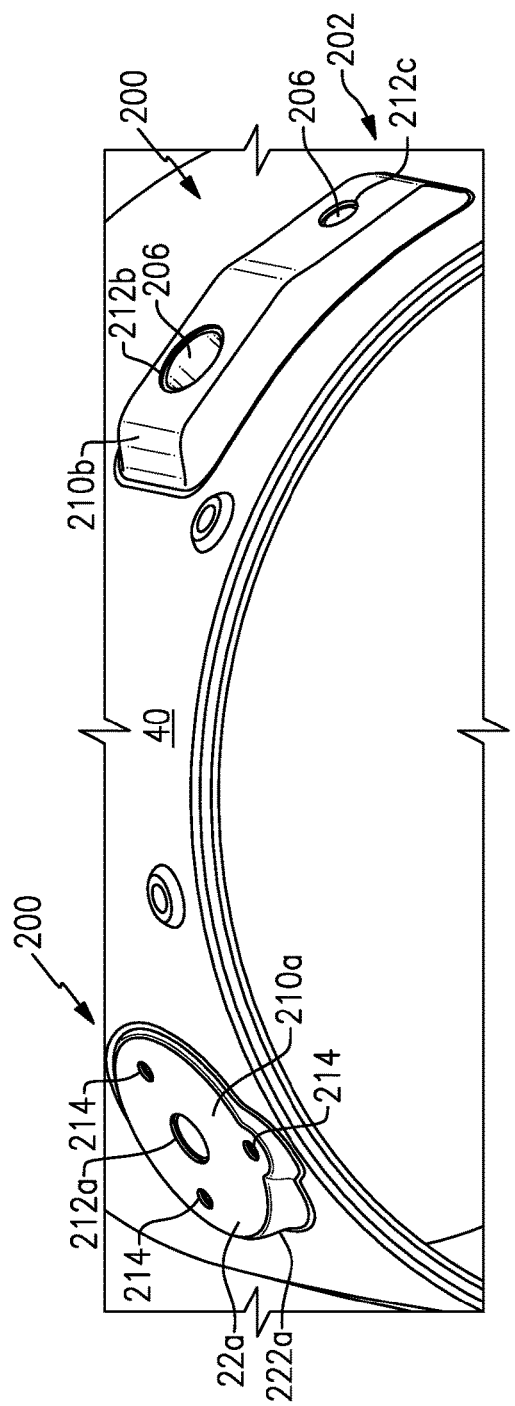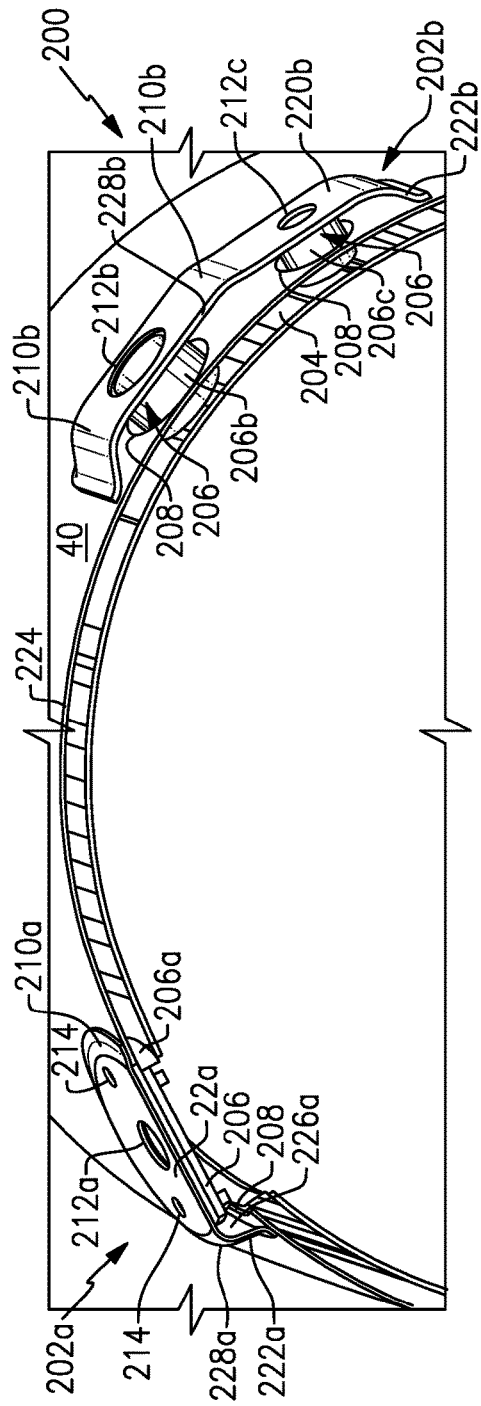

HEAT SHIELD WITH INSULATED DOSER AND SENSOR MOUNT AREAS FOR A VEHICLE EXHAUST COMPONENT

RELATED APPLICATION

This application claims priority to United States Provisional Application No. 62/312,541, filed Mar. 24, 2016.

BACKGROUND OF THE INVENTION

Vehicles include an exhaust system that transports exhaust gas generated by a combustion engine to a location on the vehicle where the heated exhaust gas can be emitted safely. Exhaust systems can include various combinations of the following components: pipes, tubes, resonators, converters, catalysts, filters, mixers, mufflers, etc. The entire exhaust system becomes very hot after a short period of operation due to the high temperatures generated during the combustion processes that produce the exhaust gas. As such, one or more of the components often utilize an outer heat shield to reduce the overall exposed external surface temperature of the components.

A typical heat shield is a thin sheet of metal that is stamped or otherwise formed to conform generally to the shape of the component to which the heat shield is to be attached, such as a muffler for example. The heat shield may be formed with legs or other structures that provide areas for attaching the heat shield to the muffler. Remaining portions of the heat shield are spaced along an outer surface of the muffler to insulate external areas of the shield from the muffler. The heat shield is typically secured to the muffler by welding; however, other attachment methods, such as straps, rivets, etc. have been used additionally or alternatively.

In certain environments it is important to shield as much of a hot exhaust component as possible. For example, some specifications may require as high as 99% of the outer surface of the component to be less than a specified temperature. This requirement can be difficult to achieve with larger components and with components having complex shapes. Further, the various attachment structures used to attach the heat shield to the component provide direct conduits for transferring heat to the heat shield, which can make it difficult to maintain a desired low outer surface temperature.

SUMMARY OF THE INVENTION

According to one exemplary embodiment, an exhaust component assembly includes a first exhaust component having at least one mount area configured to be attached to a second exhaust component. A first heat shield is attached to an outer housing of the first exhaust component and includes at least one open area at the mount area. A secondary heat shield is positioned adjacent to the first heat shield to at least partially cover the mount area.

In another embodiment according to the previous embodiment, the outer housing has an outer surface and an inner surface that defines an internal cavity for engine exhaust gases, and wherein the at least one mount area comprises at least one protrusion that extends outwardly of the outer surface of the outer housing.

In another embodiment according to any of the previous embodiments, the second exhaust component comprises an injector, and wherein the at least one mount area comprises an injector mount area with the protrusion being configured to mount the injector to the exhaust component housing. The secondary heat shield comprises an injector heat shield that includes a base wall with at least one shield opening for the injector and a side wall extending away from the base wall about a periphery of the base wall, and wherein the side wall cooperates with the first heat shield to form an insulating area between an inner surface of the injector heat shield and an outer surface of the mount area.

In another embodiment according to any of the previous embodiments, the second exhaust component comprises at least one sensor, and wherein the at least one mount area comprises a sensor mount area with the protrusion being configured to mount a sensor to the exhaust component housing The secondary heat shield comprises a sensor heat shield that includes a base wall with at least one shield opening for the sensor and a side wall extending away from the base wall about a periphery of the base wall, and wherein the side wall cooperates with the first heat shield to form an insulating area between an inner surface of the sensor heat shield and an outer surface of the mount area.

In another embodiment according to any of the previous embodiments, the secondary heat shield comprises insulating material that is positioned between a distal end of the protrusion and an inner surface of the first heat shield.

In another embodiment according to any of the previous embodiments, the exhaust component assembly comprises a mixer and the second exhaust component comprises at least one of an injector and a sensor, and wherein the secondary heat shield is positioned to at least partially overlap the open area of the first heat shield at the mount area, and including a mounting structure to attach the first heat shield to the exhaust component housing, wherein the mounting structure comprises a primary insulator located between an outer surface of the exhaust component housing an inner surface of the first heat shield and one or more secondary insulators positioned adjacent opposing sides of the primary insulator.

In another exemplary embodiment, a mixer assembly for a vehicle exhaust system includes a mixer housing having an outer surface and an inner surface that defines an internal cavity for engine exhaust gases. The mixer housing includes at least one mount area that comprises at least one protrusion that extends outwardly from the outer surface of the mixer housing. A primary heat shield is attached to the mixer housing and includes at least one open area at the mount area. A secondary heat shield is positioned relative to the primary heat shield to at least partially cover the mount area. The secondary heat shield includes at least one second opening that is aligned with the at least one open area and the at least one protrusion.

In another embodiment according to any of the previous embodiments, the secondary heat shield comprises a base wall that includes the at least one second opening and a side wall extending away from the base wall about a periphery of the base wall, and wherein the side wall cooperates with the heat shield to form an insulating area between an inner surface of the secondary heat shield and an outer surface of the mount area.

In another embodiment according to any of the previous embodiments, the at least one mount area comprises at least an injector mount area and a sensor mount area, and wherein the secondary heat shield comprises a first secondary heat shield portion mounted to the primary heat shield at the injector mount area and a second secondary heat shield portion separately mounted to the primary heat shield at the sensor mount area.

In another embodiment according to any of the previous embodiments, the primary heat shield includes one or more predefined localized hot spot areas that are subject to higher operating temperatures than a remaining area of the primary heat shield, and including additional insulating material attached to each predefined localized hot spot area.

In another exemplary embodiment, a method of assembling a heat shield to an outer housing of an exhaust component assembly includes providing at least one protruding mount area that extends outwardly of the outer housing, attaching a primary heat shield to the outer housing, the primary heat shield including at least one open area that is aligned with the mount area; and at least partially covering the mount area with a secondary heat shield that includes at least one opening aligned with the open area of the primary heat shield.

In another embodiment according to any of the previous embodiments, the at least one protruding mount area comprises at least one of an injector mount area and a sensor mount area, and wherein the secondary heat shield comprises a base wall that includes the at least one second opening and a side wall extending away from the base wall about a periphery of the base wall, and including at least partially overlapping the open area in the primary heat shield with the secondary heat shield to form an insulating area between an inner surface of the secondary heat shield and the outer surface of the at least one protruding mount area.

These and other features of the present invention can be best understood from the following specification and drawings, the following of which is a brief description.

BRIEF DESCRIPTION OF THE DRAWINGS

FIG. 7 is a perspective view of another example of a heatshield assembly including a primary heat shield and secondary heat shield at injector and sensor mount areas.

FIG. 8 is a section view of FIG. 7.

DETAILED DESCRIPTION

Figure 1:
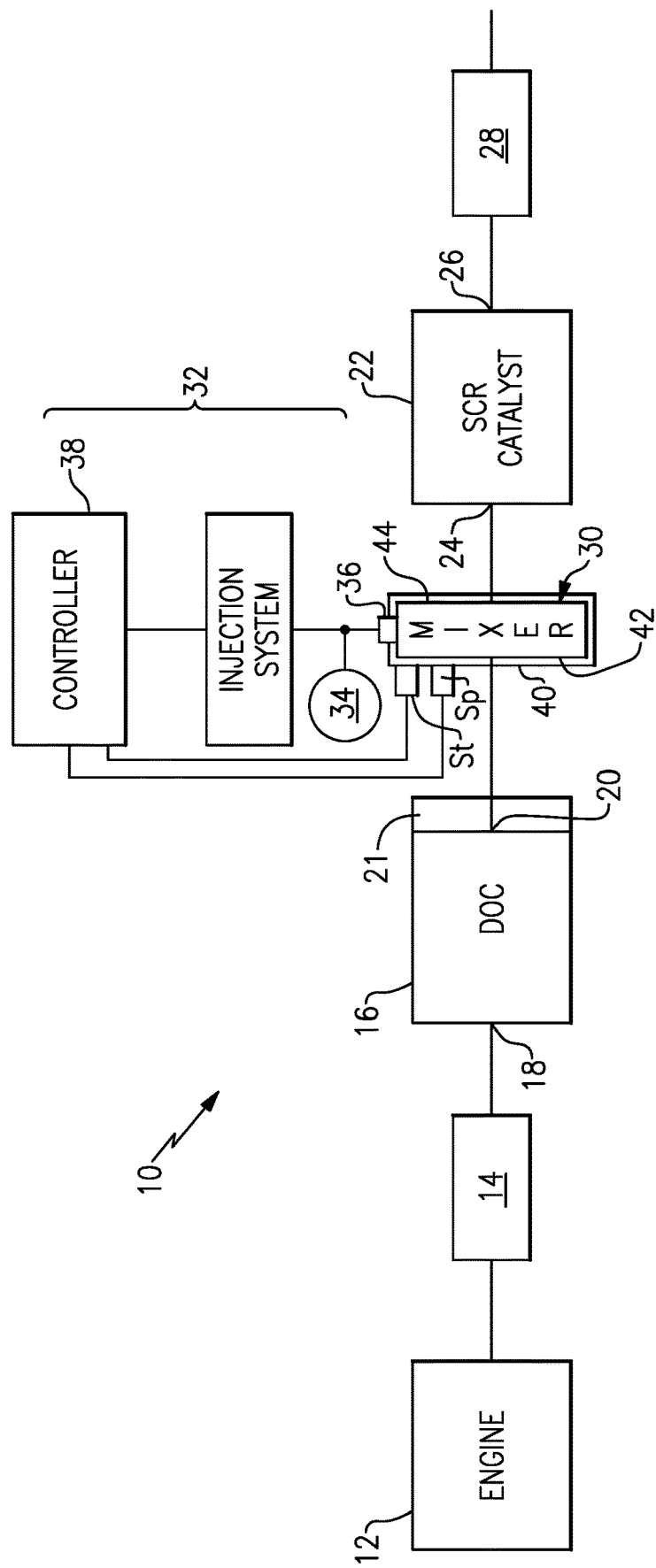
FIG. 1 is a schematic view of a vehicle exhaust system.

FIG. 1 shows a vehicle exhaust system 10 that conducts hot exhaust gases generated by an engine 12 through various upstream exhaust components 14 to reduce emission and control noise as known. Downstream from the engine are various upstream exhaust components 14 that can include one or more of the following in any combination: pipes, filters, valves, catalysts, mufflers, etc. In one example configuration, the various upstream exhaust components 14 direct exhaust gases into a diesel oxidation catalyst (DOC) 16 having an inlet 18 and an outlet 20. Downstream of the DOC 16 there may be a diesel particulate filter (DPF) 21 that is used to remove contaminants from the exhaust gas as known.

Downstream of the DOC 16 and optional DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following in any combination: pipes, filters, valves, catalysts, mufflers, etc. The components shown in FIG. 1 can be mounted in various different configurations and combinations dependent upon vehicle application and available packaging space.

In one example configuration, a mixer 30 is positioned downstream from the outlet 20 of the DOC 16 or DPF 21 and upstream of the inlet 24 of the SCR catalyst 22. The mixer 30 is used to generate a swirling or rotary motion of the exhaust gas. Any type of mixing element can be used, such as that set forth in US 2012/0216513 for example, which is assigned to the assignee of the present invention and is herein incorporated by reference. An injection system 32 is used to inject a reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, a doser 36, and a controller 38 that controls injection of the urea as known. Such a system in combination with a mixer is disclosed in U.S. application Ser. Nos. 14/737,533 and 14/737,546 for example, which are assigned to the assignee of the present invention and are herein incorporated by reference.

In one example, the mixer 30 includes a heat shield 40 that is mounted to an outer housing 42 of the mixer 30 using a unique low conductive support mount configuration 43. The low conductive support mount 43 is configured such that the heat internally within the exhaust component is maintained at the desired temperature levels while the outer surface of the component is maintained at much cooler surface temperatures. In one example embodiment shown in FIG. 2, the low conductive support mount 43 comprises a primary insulator 44 that is located between an outer surface 46 of the outer housing 42 and an inner surface 48 of the heat shield 40, and one or more secondary insulators 50 positioned adjacent opposing sides of the primary insulator 44.

Figure 3:
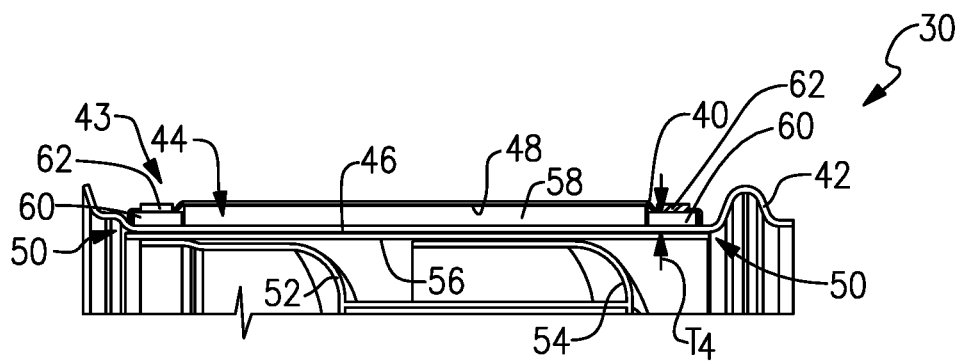
FIG. 3 is a section view of another example of a heatshield and mount assembly for a mixer such as that shown in FIG. 2, wherein the heatshield and mount assembly are in a compressed and final installation position.

FIG. 3 shows a section view of the mixer 30 which includes inlet 52 and outlet 54 baffles that are surrounded by a mixer body 56. The body 56 is mounted within the outer housing 42 of the mixer 30. In this example, the primary insulator 44 comprises an insulation mat 58 that surrounds the outer surface 46 of the housing 42. The secondary insulators 50 comprise one or more bands or rings 60 that are used in combination with the insulation mat 58 to mount the heat shield 40 on the housing 42. In the example shown, one ring 60 is placed at one edge of the mat 58 and another ring 60 is placed at an opposite edge of the mat 58. The heat shield 40 is placed over outer surfaces of the mat 58 and rings 60 and is then compressed radially inward to compress the mat 58 against the housing 42. One or more additional attachment structures such as straps or clamps 62, for example, are then used to hold the mat 58 in compression. The combination of primary 44 and secondary 50 insulators is used to insulate the heat shield 40 from the outer housing 42 by removing direct contact (conduction path) between the housing 42 and heat shield 40, while also maintaining a generally constant gap between them.

The heat shield 40 can be made from a metallic material such as a steel sheet for example, or the heat shield 40 can be made from a non-metallic material such as composite or plastic material, for example. The rings 60 protect the mat 58, provide structural support for the heat shield 40, and resist movement of the heat shield 40 during vehicle operation. The rings 60 can comprise a band of fiber mat or a fibrous material such as rope, for example. The rings 60 preferably comprise bands of a high-stiffness mat, a rope of braided rope material, a rope of braided wire material, a rope that includes glass fibers, or other similar materials. The rings 60 can be comprised of a compressible or non-compressible material. In one example, the mat 58 has a first stiffness and the rings 60 have a second stiffness that is greater than the first stiffness.

Figure 2:
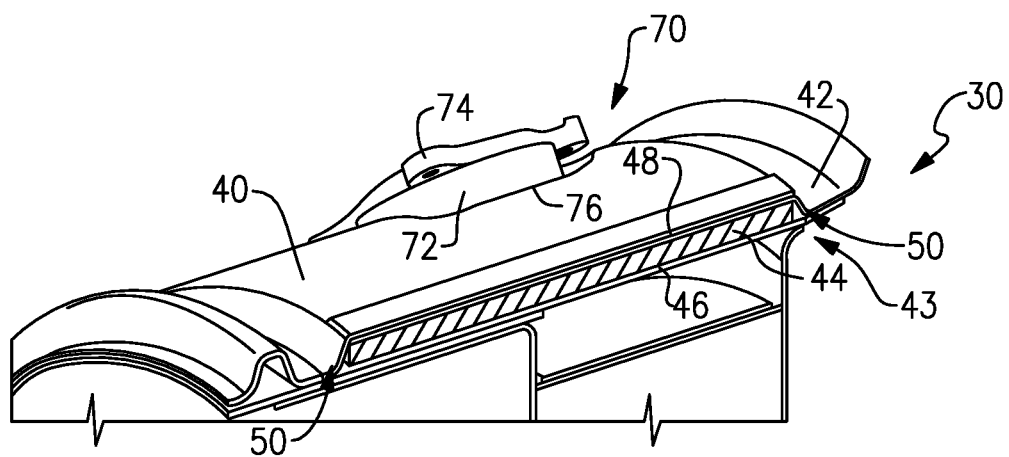
FIG. 2 is a perspective view in section of one example of a mixer and heat shield assembly as used in the vehicle exhaust system of FIG. 2.

FIGS. 2-3 show one example configuration of primary and secondary insulators. Additional examples are shown in co-pending application PCT/US2017/023713 filed on Mar. 23, 2017, which is assigned to the assignee of the subject application and is hereby incorporated by reference.

The mixer 30 has one or more mount areas 70 (FIG. 2) configured to be attached to be attached to a secondary exhaust component such as an injector or sensor, for example. In the example shown in FIG. 2, the mount area 70 comprises a protrusion 72 that interfaces with a mounting flange 74 of the injection system 32. The heat shield 40 includes at least one open area or first opening 76 that is aligned with the protrusion 72. The protrusion 72 comprises the mount structure for the injector or doser 36 (FIG. 1). The protrusion 72 can be formed as part of the housing 42, can be formed as part of the mixer body 56, or can be a structure that is separately attached to either the housing 42 or the mixer body 56.

Figure 4:
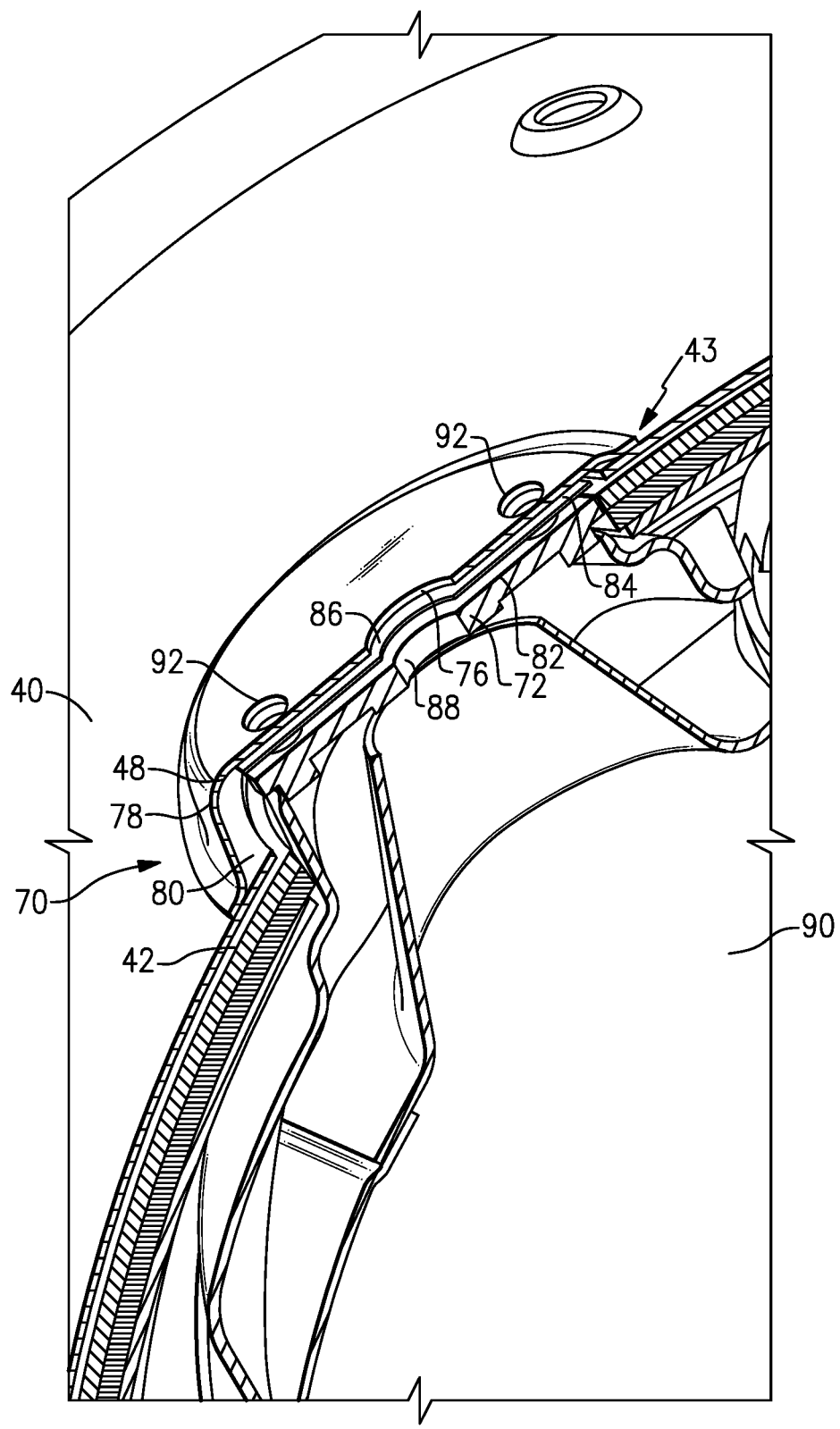
FIG. 4 is a section perspective view of one example of a primary heat shield and secondary heat shield at an injector mount area.

FIG. 4 shows one example configuration for a heat shield assembly for an injector mount area 70. In this example, the heat shield 40 comprises a primary heat shield that is attached to the housing 42 as described above. The heat shield 40 includes a protruding portion 78 that extends over the protrusion 72 such that there is a gap 80 between the inner surface 48 of the heat shield 40 and an outer surface 82 of the protrusion 72. The protruding portion 78 can be formed as part of the heat shield 40 or can be separately attached as will be discussed in greater detail below.

A secondary heat shield 84 is positioned within the gap 80 to at least partially cover the mount area 70. In the example shown in FIG. 4, the secondary heat shield 84 comprises an insulating disc or mat of material that is positioned between a distal end face of the protrusion 72 and the primary heat shield 40. Additional insulating material can be positioned around outer walls of the protrusion 72 to fill the gap 80 as needed.

The secondary heat shield 84 includes an opening 86 that aligns with the first opening 76 in the primary heat shield 40. These shield openings 86, 76 align with an opening 88 in the protrusion 72. When the injector or doser 36 is mounted to the protrusion 72, the doser 76 injects a fluid through the aligned openings 76, 86, 88 and into an internal cavity 90 of the mixer 30. The fluid can then mix with exhaust gases flowing through the internal cavity 90.

The primary heat shield 40, secondary heat shield 84, and protrusion 72 may also include additional aligned openings 92 configured to receive fasteners (not shown), for example. The fasteners are inserted through the aligned openings 92 to secure the injector to the mounting flange 74 (FIG. 2) and protrusion 72.

Figure 5:
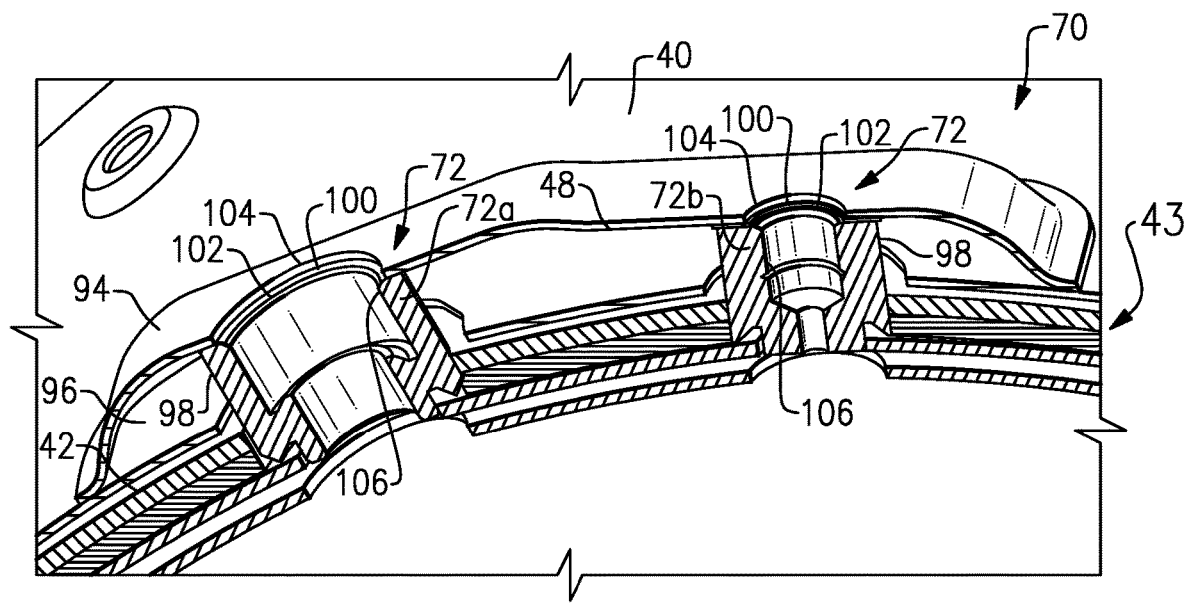
FIG. 5 is a section perspective view of one example of a primary heat shield and secondary heat shield at a sensor mount area.

FIG. 5 shows one example configuration for a heat shield assembly for a sensor mount area 70. In this example, the heat shield 40 comprises a primary heat shield that is attached to the housing 42 as described above. In one example, the sensor mount area 70 comprises a mount area for at least two sensors such as a temperature sensor St and a pressure sensor Sp (FIG. 1), for example. In this example, the protrusion 72 comprises a first protrusion 72a for first sensor and a second protrusion 72b for a second sensor. The heat shield 40 includes a protruding portion 94 that extends over the protrusions 72a, 72b such that there is a gap 96 between the inner surface 48 of the heat shield 40 and an outer surface 98 of the protrusions 72a, 72b. It should be understood that while a single protruding portion 94 is shown, the heat shield 40 could also include separate protruding portions for each sensor protrusion 72a, 72b, or any combination of shared or separate protrusions 72. Further, the protruding portion 94 can be formed as part of the heat shield or can be separately attached as will be discussed in greater detail below.

A secondary heat shield 100 is positioned within the gap 96 to at least partially cover the mount area 70. In the example shown in FIG. 5, the secondary heat shield 100 comprises an insulating disc or mat of material that is positioned between a distal end face of each of the protrusions 72a, 72b and the primary heat shield 40. Additional insulating material can be positioned around outer walls of the protrusions 72a, 72b to fill the gap 96 as needed.

The secondary heat shield 100 includes openings 102 that align with corresponding openings 104 in the primary heat shield 40. These shield openings 102, 104 align with openings 106 in the protrusions 72a, 72b. When the sensors St, Sp are mounted to the protrusions 72a, 72b, the sensors are able to sense, measure, monitor, etc. temperature and pressure as needed. The primary heat shield 40, secondary heat shield 84, and protrusions 72 may also include additional aligned openings as needed to receive other sensors, fasteners, or other objects (not shown), for example.

Figure 6A:
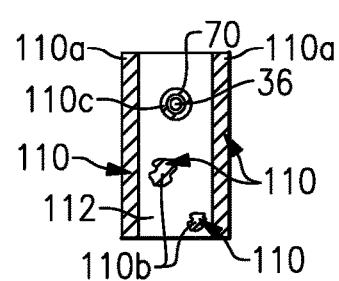
FIG. 6A is a schematic view of a heatshield assembly with localized hot spots.
Figure 6B:
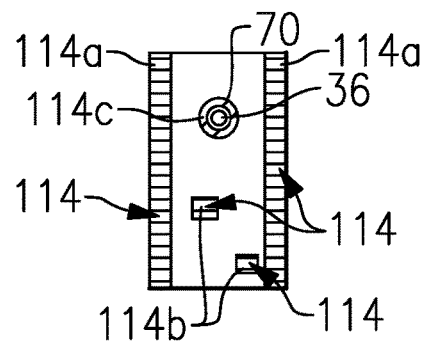
FIG. 6B is a schematic view of the heatshield assembly of 6A with additional insulating material covering the localized hot spots.

FIGS. 4 and 5 show examples of using an additional heat shield structure at certain local areas, e.g. injector and sensor mount areas, to provide additional insulation at these defined areas. FIGS. 6A-6B show an example where the primary heat shield 40 includes one or more additional predefined localized hot spot areas 110 that may be subject to higher operating temperatures than a remaining area 112 of the primary heat shield 40. The locations of such hot spot areas 110 on the heat shield 40 can vary between different types of mixers and/or different types of exhaust components to which the heat shield 40 is to be mounted.

Once these hots spot areas 110 are identified for a particular application, a secondary heat shield 114 that includes additional insulating material can be applied to each predefined localized hot spot area 110 as shown in FIG. 6B. In one example, a mixer may include hot spot areas 110a along edges of the heat shield 40. An additional ring or layer of steel or insulation material 114a can then be applied at these edge locations. In additional to, or instead of these edge areas, other localized hot spot areas 110b can be identified on the heat shield 40 and patches 114b of insulating material can be applied at these discrete locations.

The patch 114b of insulating material can be applied to an outer or inner surface of the heatshield 40, or the patch 114b could be molded into the heatshield 40. The patch 114b can be made of any insulating or reflecting material such as a spray-on coating, thermal barrier coating, fiber-paper mat, layers of foil, etc., for example.

As discussed above, additional hot spot areas 110c can be found at the sensor or injector mount areas 70. Secondary heat shields 114c can comprise insulating material that is shaped around the respective locating protrusion. The secondary heat shields 114c can comprise any insulating material and can be made from other insulating structures such as canning mat or fiber ropes or bands, for example. An additional heat shield 84, 100 can also be placed between the protrusions and the primary heat shield as shown in FIGS. 4-5.

FIGS. 7-8 show another example of a heat shield assembly 200 for a mixer 30. In this example, there is a primary heat shield 40 as described above, and secondary heat shields at multiple mount areas 202. An outer mixer housing 204 includes the mount areas 202 to allow injectors or sensors, for example, to be attached to the mixer 30. As described above, the mount areas 202 comprise one or more protrusions 206 that extend outwardly of the outer housing 204. The primary heat shield 40 includes an opening 208 that is aligned with each protrusion 206.

In one example, the protrusion 206a comprises the mount structure for the injector or doser 36 (FIG. 1). The protrusion 206a can be formed as part of the housing 204, can be formed as part of the mixer body 56, or can be a structure that is separately attached to either the housing 204 or the mixer body 56. In this example, a secondary heat shield 210a is positioned relative to the primary heat shield 40 to at least partially cover the mount area 202a for the injector. The secondary heat shield 210a includes an opening 212a that aligns with the opening 208 in the primary heat shield 40. These shield openings 208, 212a align with a corresponding opening in the protrusion 206a as described above. When the injector or doser 36 is mounted to the protrusion 206a, the doser 36 injects a fluid through the aligned openings 208, 212a and into an internal cavity of the mixer 30.

The primary heat shield 40, secondary heat shield 210a, and protrusion 206a may also include additional set of aligned openings 214 configured to receive fasteners (not shown), for example. The fasteners are inserted through the aligned openings 214 to secure the injector to the mounting flange 74 (FIG. 2) and protrusion 206a.

In one example, the secondary heat shield 210a comprises a base wall 220a that includes the opening 212a and further includes a side wall 222a extending away from the base wall 220a about a periphery of the base wall 220a. Thus, the secondary heat shield 210a comprises a generally cup-shaped component that is used to cover the mount area 202a. The side wall 222a is connected to an outer surface 224 of the primary heat shield 40 to form an insulating area 226a between an inner surface 228a of the secondary heat shield 210a and the outer surface 224 of the primary heat shield 40 at the injector mount area 202a. An additional heat shield, i.e. a tertiary heat shield can be installed, if needed, between a distal end face of the protrusion 206a in a manner similar to that shown in FIG. 4.

The heat shield assembly 200 of FIGS. 7-8 also includes one example configuration for a sensor mount area 202b. In this example, the sensor mount area 202b comprises a mount area for at least two sensors such as a temperature sensor St and a pressure sensor Sp (FIG. 1), for example. In this example, the protrusion 206 comprises a first protrusion 206b for first sensor and a second protrusion 206c for a second sensor. In this example, a secondary heat shield 210b is positioned relative to the primary heat shield 40 to at least partially cover the mount area 202b for the sensors. It should be understood that while a single secondary heat shield 210b is shown, individual secondary heat shields 210b could also be used for each sensor protrusion 206b, 206c.

The secondary heat shield 210b includes openings 212b, 212c that align with respective openings 208 in the primary heat shield 40. These shield openings 208, 212b and 208, 212c align with a corresponding opening in the protrusions 206b, 206c as described above. When the sensors St, Sp are mounted to the protrusions 206b, 206c, the sensors are able to sense, measure, monitor, etc. temperature and pressure as needed. The primary heat shield 40, secondary heat shield 210b, and protrusions 206b, 206c may also include additional aligned openings as needed to receive other sensors or fasteners (not shown), for example, to secure the sensors to the mixer 30.

In one example, the secondary heat shield 210b comprises a base wall 220b that includes the openings 212b, 212c and further includes a side wall 222b extending away from the base wall 220b about a periphery of the base wall 220b. Thus, the secondary heat shield 210b comprises a generally cup-shaped component that is used to cover the mount area 202b over both sensors. The side wall 222b is connected to the outer surface 224 of the primary heat shield 40 to form an insulating area 226b between an inner surface 228b of the secondary heat shield 210b and the outer surface 224 of the primary heat shield 40 at the injector mount area 202b. Also, if needed, an additional heat shield can be installed between a distal end of the protrusions 206b, 206c in a manner similar to that of FIG. 6.

Figure 9:
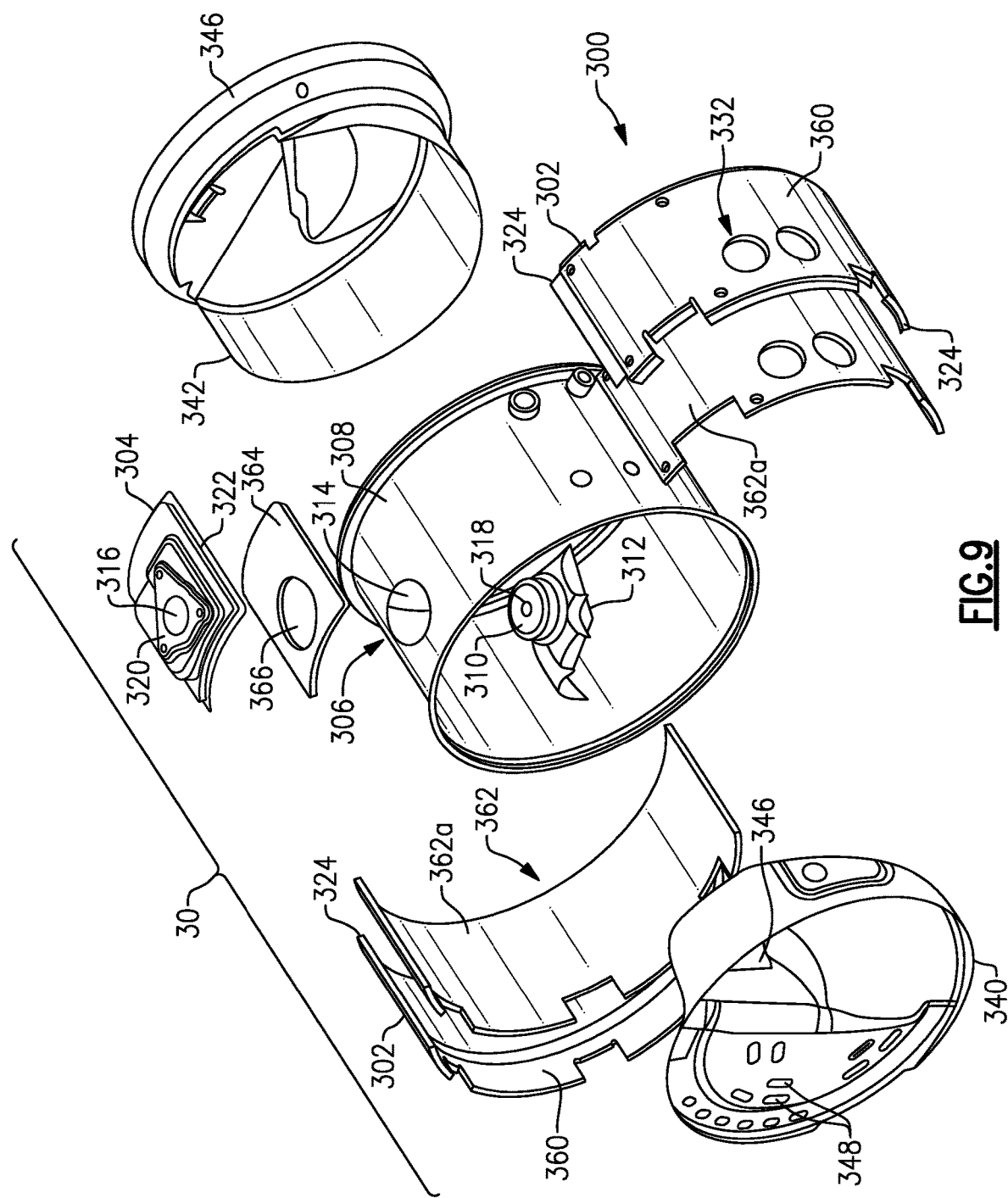
FIG. 9 is an exploded view of another example of a mixer with a heatshield assembly including a primary heat shield and secondary heat shield at an injector mount area.

FIGS. 9-13 show another example of a heat shield assembly 300 for a mixer 30. In this example, there is a primary heat shield 302 similar to that described above, and a secondary heat shield 304 at an injector mount area 306. As shown in FIG. 9, an outer mixer housing 308 includes the mount area 306 to allow the injector or doser 36 (FIGS. 11-13), for example, to be attached to the mixer 30. As described above, the mount area 306 can comprise one or more protrusions 310 that extend outwardly of the outer housing 304. In this example, the protrusion 310 is formed as part of a mixer inlet assembly 312 that facilitates mixing of the injected fluid with exhaust gas flowing through the mixer 30. The outer housing 308 includes an opening 314 through which the protrusion 310 extends.

Figure 11:
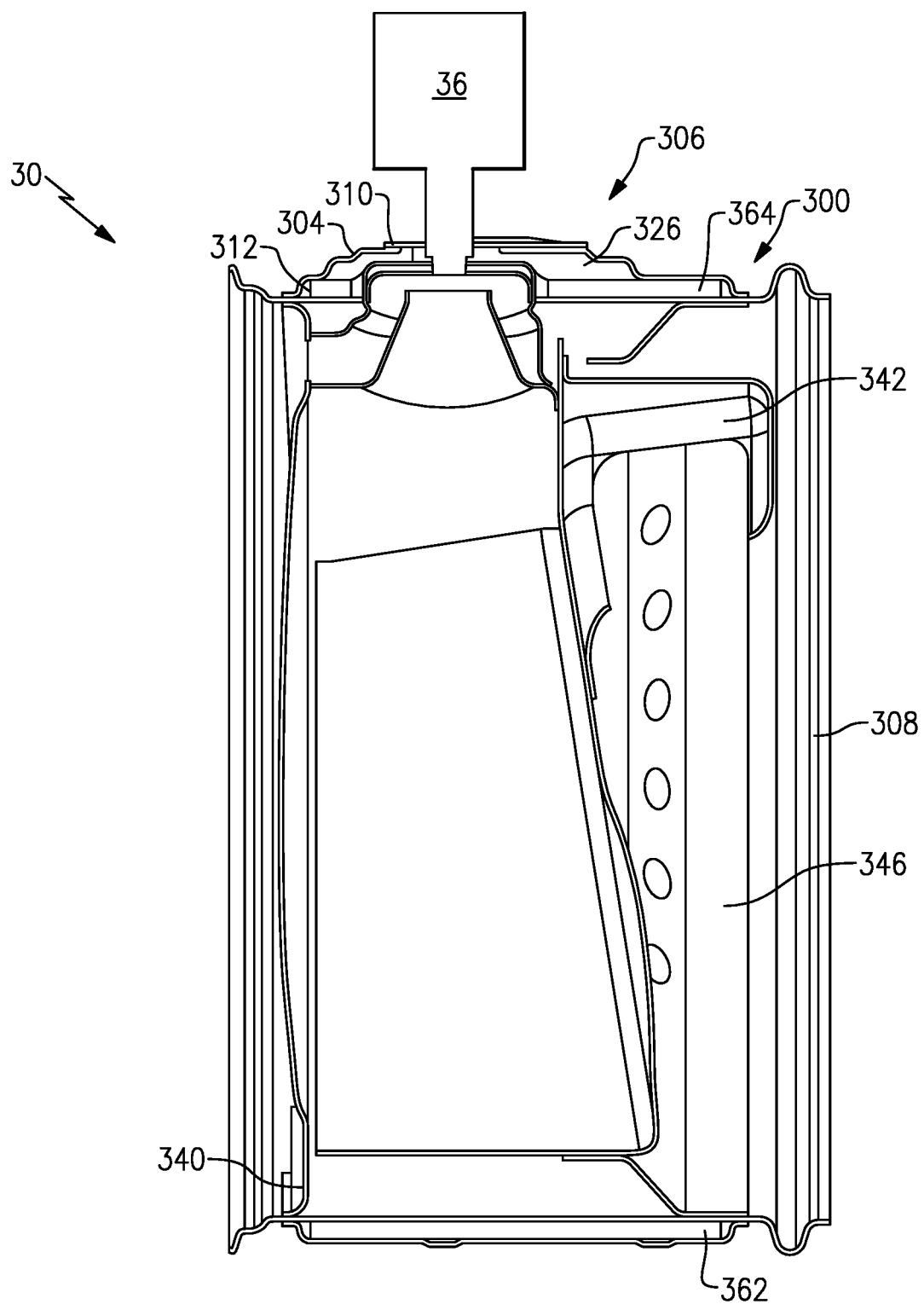
FIG. 11 is a side section view of the mixer of FIG. 9 and additionally including a doser.
Figure 12:
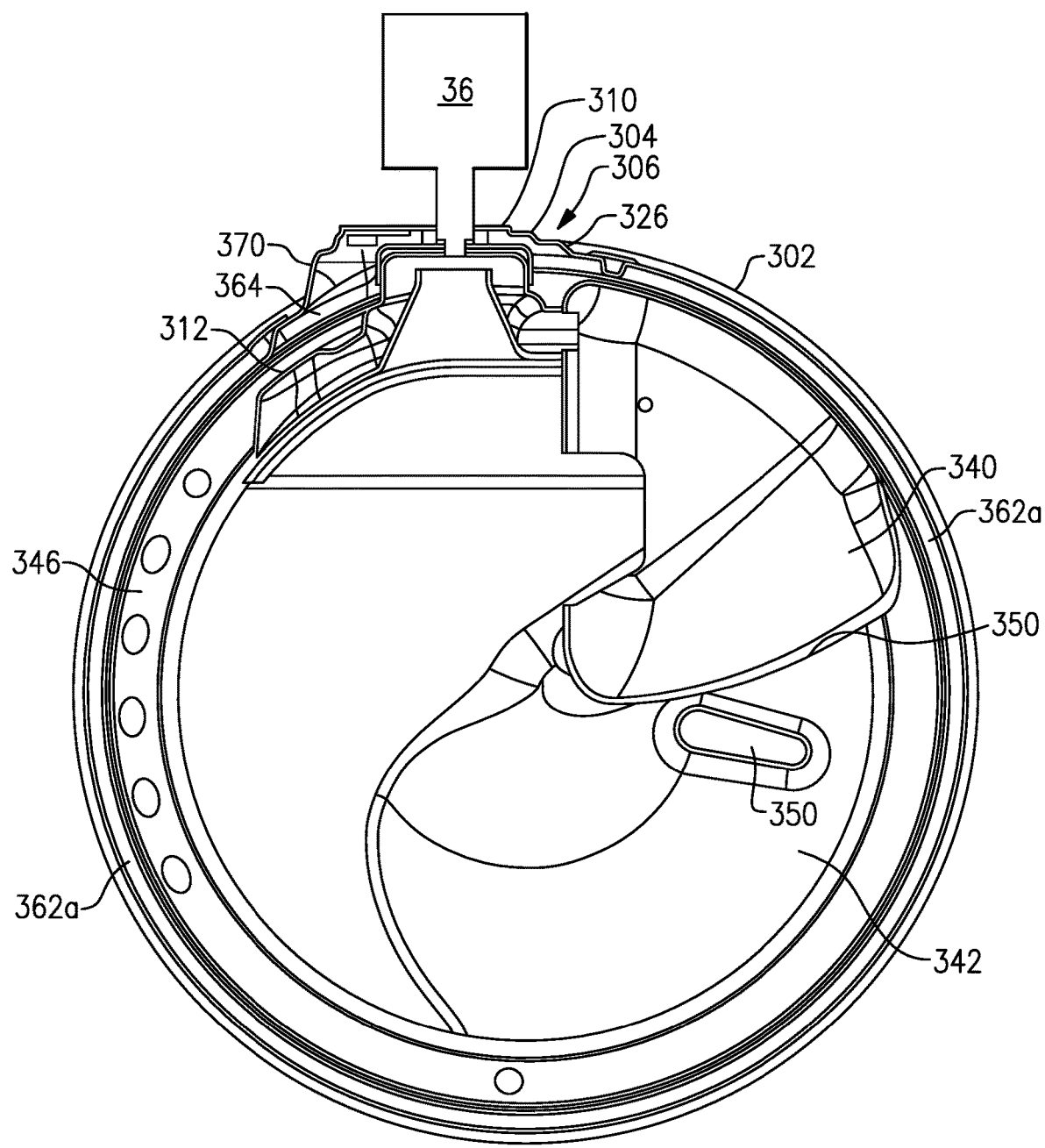
FIG. 12 is an end section view of the example shown in FIG. 11.
Figure 13:
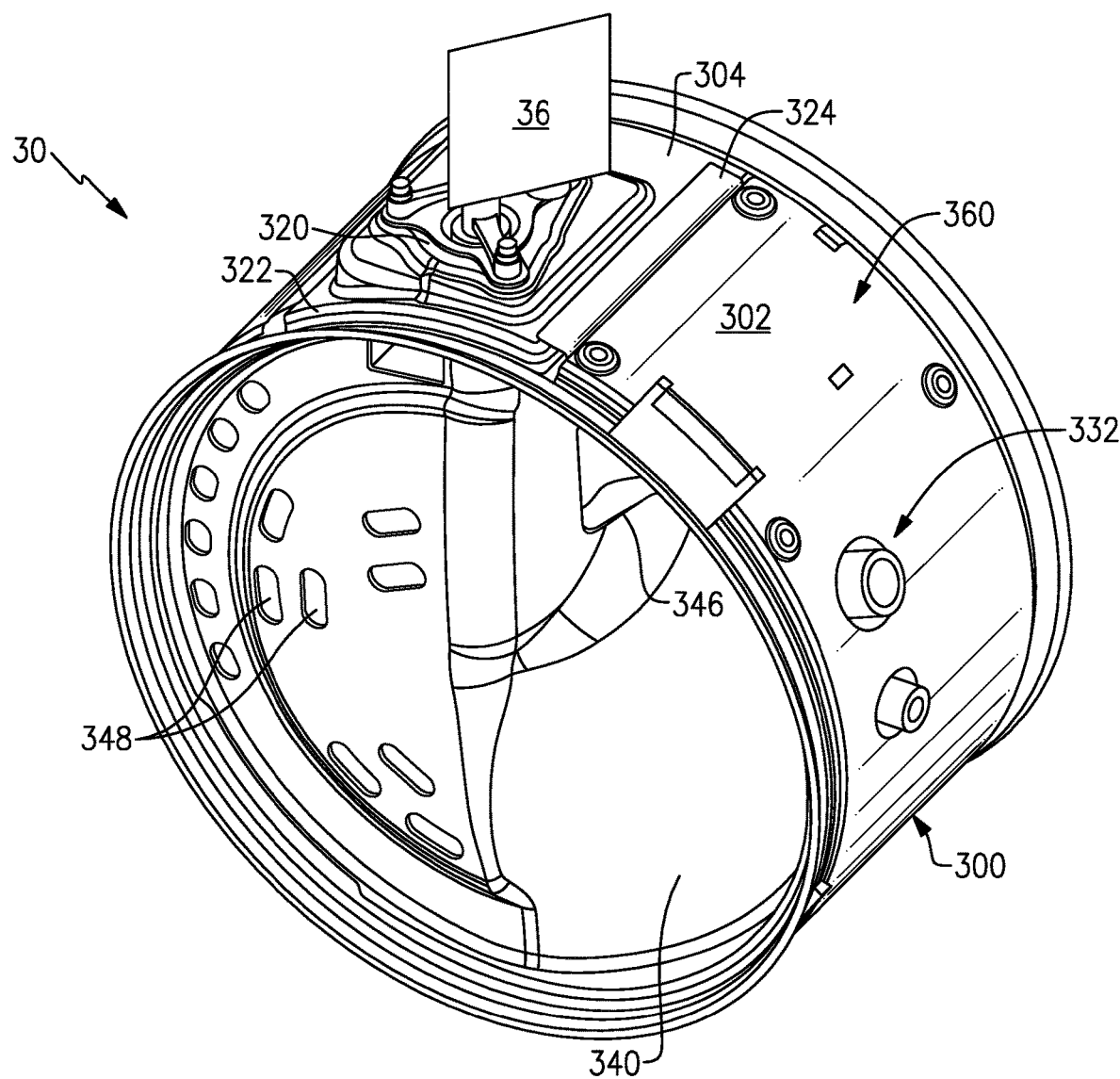
FIG. 13 is a perspective view of the example shown in FIG. 11.

In this example, the protrusion 310 comprises the mount structure for the injector or doser 36 (FIGS. 11-13). The primary heat shield 302 includes an open area or gap 370 (FIG. 12) at the mount area 306. The secondary heat shield 304 is positioned relative to the primary heat shield 302 to at least partially cover the gap 370 and mount area 306 for the injector 36. The secondary heat shield 304 includes an opening 316 that aligns with the opening 314 in the housing 308. These aligned openings 314, 316 align with a corresponding opening 318 in the protrusion 310. When the injector or doser 36 is mounted to the protrusion 310, the doser 36 injects a fluid through the aligned openings 314, 316, 318 and into an internal cavity of the mixer 30.

In one example, the secondary heat shield 304 comprises a base wall 320 that includes the opening 316 and further includes a side wall 322 extending away from the base wall 320 about a periphery of the base wall 320. Thus, the secondary heat shield 304 comprises a generally cup-shaped component that is used to cover the open area in the primary heat shield 302 at the mount area 306. The side wall 322 is connected to or supported by the primary heat shield 302 along one edge 324 of the heat shield 302 to form an insulating area 326 (FIG. 11-12) between an inner surface 328 of the secondary heat shield 304 and an outer surface of the injector mount area 306. An additional heat shield, i.e. a tertiary heat shield can be installed, if needed, between a distal end face of the protrusion 310 in a manner similar to that shown in FIG. 4.

The heat shield assembly 300 of FIGS. 9-13 may also include a secondary heat shield for a sensor mount area as indicated at 332. The secondary heat shield for the sensor mount area 332 could be formed in a manner similar to that of the secondary heat shield 304 for the injector 36.

The example shown in FIGS. 9-13 shows an inlet baffle 340, an outlet baffle 342, and a mounting ring 344 that are mounted within the outer housing 308. The inlet baffle 340 includes a primary inlet opening 346 through which a majority of exhaust gas enters the mixer and a plurality of secondary inlet openings 348 through which a remaining portion of exhaust gas enters the mixer 30. The outlet baffle 342 includes one or more outlet openings 350 (FIG. 12) through which a mixture of exhaust gas and injected fluid exit the mixer 30.

In this example the primary heat shield 302 includes a pair of C-shaped shield portions 360 that are positioned to cooperate with the secondary heat shield 304 to surround the outer housing 308. The heat shield portions 360 are separated by an opening, open area, or a gap 370 (FIG. 12) that is located at the mount area 306. A primary insulator 362 that comprises one or more insulating mat sections 362a positioned between the outer housing 308 and the heat shield portions 306. Edges 324 of the heat shield portions 360 extend to cooperate with the secondary heat shield 304 to surround the housing 308. An additional insulating mat section 364 is positioned between the secondary heat shield 304 and the outer housing 308 such that the primary insulating 362 also surrounds the outer housing 308. Optionally, the primary heat shield 302 could be form with an opening that would surround the secondary heat shield 304 in a manner similar to that shown in FIGS. 7-8.

In one example, the primary heat shield 40, 302 is made of two C-shaped heat shield portions (only one portion is shown in FIGS. 7-8) that are attached together when a pressure is applied during assembly. The possible types of attachment include clamping, clipping, brazening or welding the two portions together. In one example, the heat shield portions are wrapped around the mat 58, 362 and rings 60 and are compressed against the housing 42, 308 at a pressure sufficient to compress the mat 58, 362 to a desired level. Edges of the heat shield portions can then be attached together such that the heat shield 40, 302 is held in compression against the housing 42, 308. Optionally, more than two heat shield portions could be used, or a single heat shield portion could be used that is bent or wrapped around the outer housing.

In each embodiment, the whole component assembly is held together in compression. The heat shield 40, 302 is put in position at a defined and controlled pressure as discussed above. The heat shield portions are attached together when the pressure is applied. If the compressive force is not sufficient to maintain the assembly in place due to axial loading, some features can be added to the housing 42, 308 to help keeping the assembly in place, such as mechanical stops for example. If the compressive force is not sufficient to maintain the assembly in place due to radial loading, additional mount structures such as straps or clamps 62 can be installed.

Figure 10:
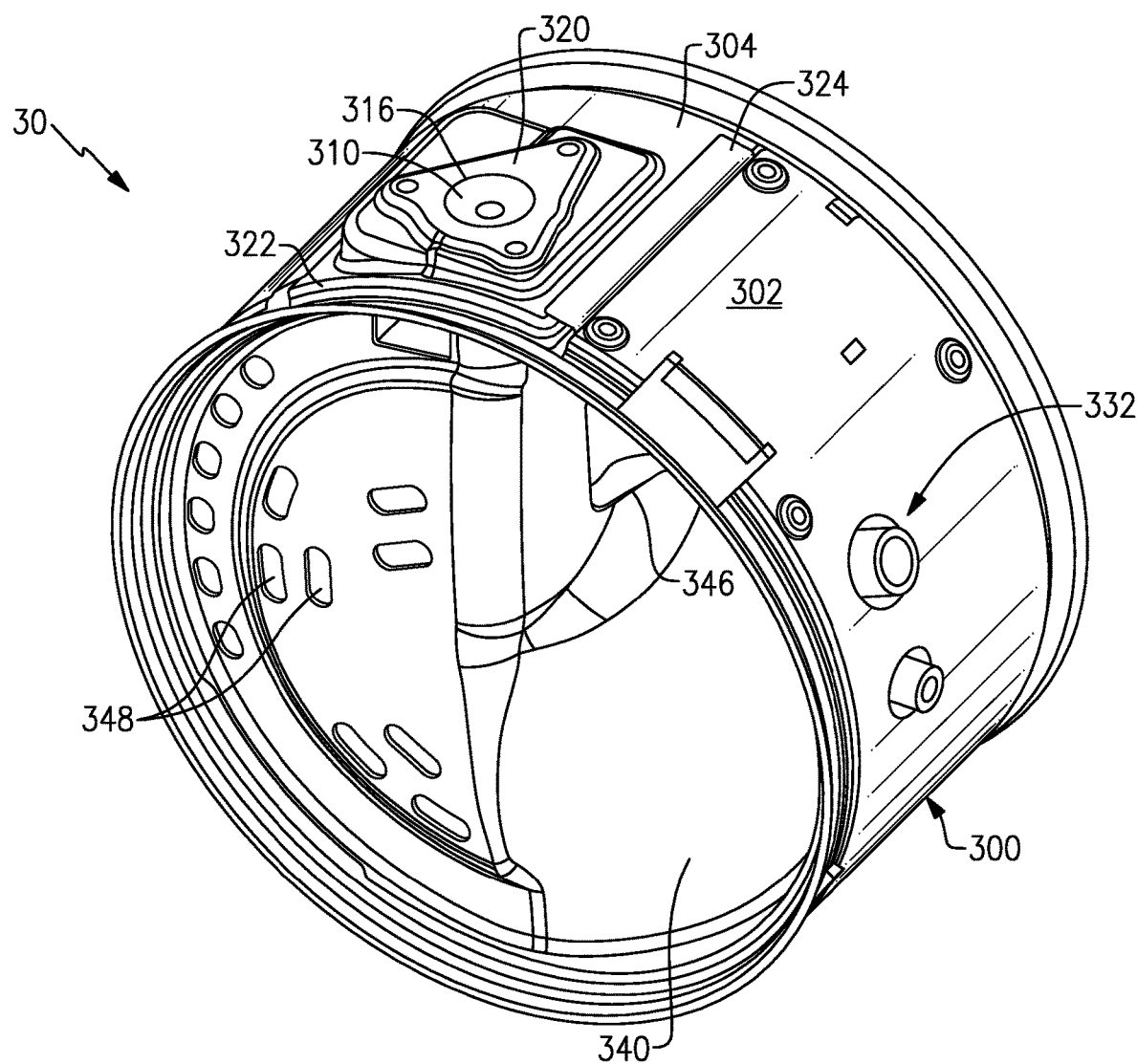
FIG. 10 is a perspective assembled view from an inlet end of the mixer of FIG. 9.
Figure 14:
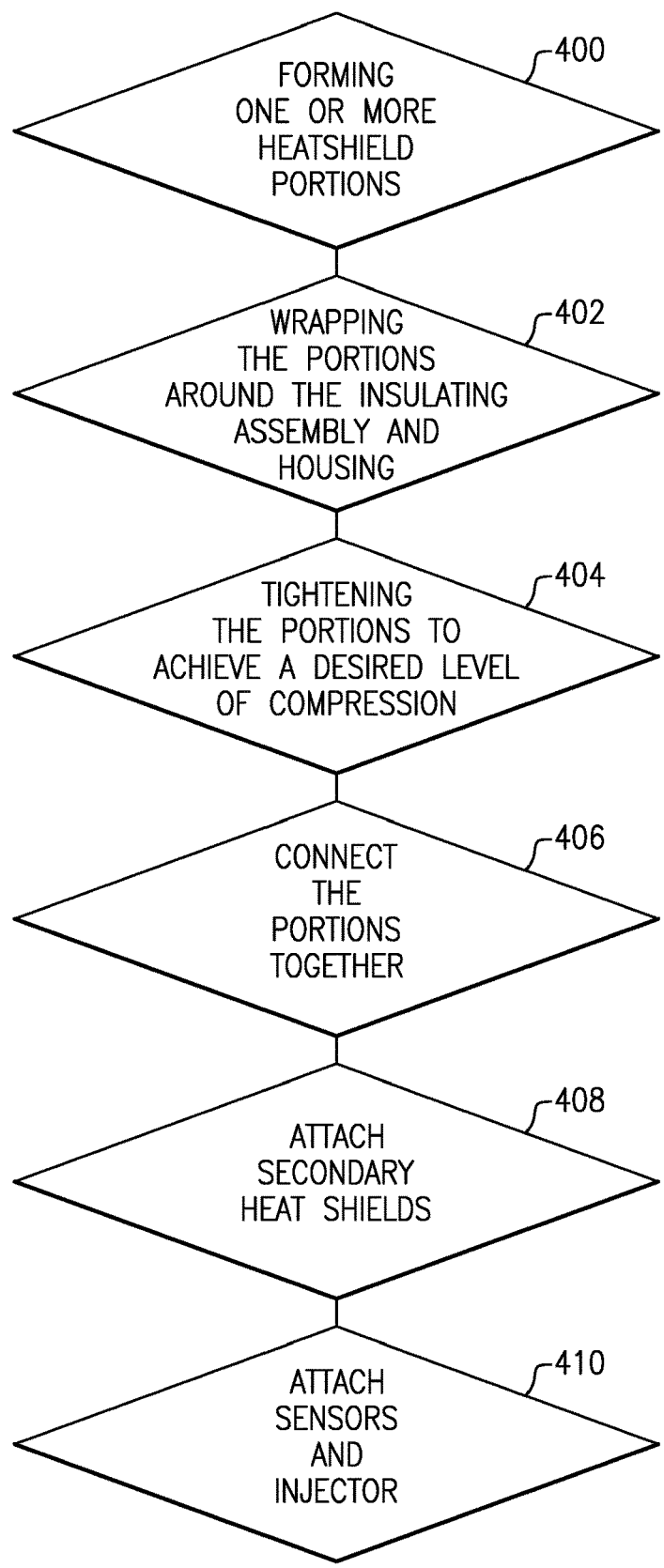
FIG. 14 is a flow chart describing one example method of assembling a heat shield onto an exhaust component.

In one example method using a tourniquet process, the method includes a step of forming 400 (FIG. 14) one or more heat shield portions by pre-rolling the portions, for example, and then wrapping 402 the portions around the internal insulating assembly 44, 50, 362 and mixer housing 42, 308. The portions are then tightened 404 around the internal insulating assembly and are tack welded to each other at a location where the portions overlap with each other or are supported by the secondary heat shield 304 as shown in FIG. 10. The portions are tightened until a desired level of compressive force is achieved for the subject component application. Next, the heat shield portions are connected to each other 406 at an overlap seam that is sealed via welding or brazing, for example. In the example of FIGS. 9-13, one set of corresponding edges 324 of the heat shield portions are connected to each other while an opposite set of edges 324 are connected at the secondary heat shield. In the example of FIGS. 7-8 the portions of the heat shield 40 would be connected to each other both sets of edges. Next, the secondary heat shields are attached 408 to the mixer and then the additional components, such as sensors or injectors for example, are attached 410. These attachment configurations are just examples and it should be understood that other methods of attachment and other attachment configurations could be used in addition to, or as an alternative to, those shown in the examples.

For the example of FIGS. 7-8, once the primary heat shield 40 has been assembled, the openings 208 in the heat shield 40 are in alignment with the protrusions 206. Next, the openings 212a, 212b, 212c of the secondary heat shields 210a, 210b are aligned with respective openings 208 in the primary heat shield 40 such that the secondary heat shields 210a, 210b can be attached 408 to the primary heat shield 40 at the mount areas 202a, 202b. The secondary heat shields 210a, 210b can be attached via welding or brazing the side walls 222a, 222b to the outer surface 224 about a periphery of the side walls 222a, 222b, for example. The injector and sensors can then be installed 410. It should be understood that this is just one example of an assembly method and that other methods of installing the heat shields and compressing the internal insulating assembly can be used.

For the example of FIGS. 9-13, the additional insulating mat section 364 includes an opening 368 (FIG. 9) that is aligned with the opening 314 in the housing 308 and with the opening 316 in the secondary heat shield 304. These openings 368, 316, 314 are also aligned with the opening in the protrusion 310. The secondary heat shield 304 can then be attached to the mixer.

In each of the disclosed embodiments, additional insulating material can used in the insulating area formed between the inner surface of the secondary heat shields and the mount area. In addition to, or as an alternative, the inner surface of the secondary heat shields can be coated with an insulating coating.

It should be understood that while the secondary heat shields, primary heat shield, and unique low conductive support mount configuration are shown in this example as being mounted to a mixer, the subject heat shield assembly and associated mounting configuration can be used with any other vehicle exhaust system component as needed. For example, the subject heat shield mounting configurations could be used with mufflers, DOCs, DPFs, tailpipes, etc. Further, the subject heat shield mounting configurations could be used with larger box-shaped system components that include flat sides, where the primary heatshield would be pre-formed to get in compression and with the second heat shield being subsequently attached.

The subject invention utilizes a unique heat shield assembly that includes a primary heat shield used in combination with one or more secondary heat shields located at mount areas and/or at localized hot spot areas. Further, this heat shield assembly is used with a mounting structure that comprises a primary insulator in combination with one or more secondary insulators as described above. The primary insulators are used as structural support to attach the primary heat shield to the outer housing. The secondary insulators are configured to hold the heat shield and primary insulator in place relative to the outer housing. Exemplary secondary insulators comprise bands or rings that provide for a higher stiffness area than that of the mat.

As discussed above, temperatures at the outer surface of the housing can be as high as 600 degrees Celsius. In each of the disclosed examples, the heat shield assembly including the primary and secondary heat shields in combination with the mounting structure maintain as high as 90-99% of an outer surface of the heat shield at a temperature that can be as low as approximately 300 degrees Celsius or even as low as 200 degrees Celsius, for example, which is a significant improvement over existing heat shield configurations.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The invention claimed is:

1. An exhaust component assembly comprising:
a first exhaust component having at least one mount area configured to be attached to a second exhaust component, wherein the first exhaust component comprises a mixer;
a first heat shield attached to substantially surround an outer housing of the mixer, the first heat shield including at least one open area at the mount area; and
a secondary heat shield positioned to at least partially cover the mount area, wherein the secondary heat shield at least partially overlaps the first heat shield.

2. The exhaust component assembly according to claim 1 wherein the outer housing has an outer surface and an inner surface that defines an internal cavity for engine exhaust gases, and wherein the at least one mount area comprises at least one protrusion that extends outwardly of the outer surface of the outer housing.

3. The exhaust component assembly according to claim 2 wherein the secondary heat shield comprises a base wall that includes at least one shield opening aligned with the open area in the first heat shield and a side wall extending away from the base wall about a periphery of the base wall, and wherein the side wall cooperates with the heat shield to form an insulating area between an inner surface of the secondary heat shield and an outer surface of the mount area.

4. The exhaust component assembly according to claim 3 wherein the inner surface of the secondary heat shield is coated with an insulating coating.

5. The exhaust component assembly according to claim 3 including insulation material in the insulating area between the first heat shield and the secondary heat shield at the mount area.

6. The exhaust component assembly according to claim 2 wherein the second exhaust component comprises an injector, and wherein the at least one mount area comprises an injector mount area with the protrusion being configured to mount the injector to the outer housing, and wherein the secondary heat shield comprises an injector heat shield that includes a base wall with at least one shield opening for the injector and a side wall extending away from the base wall about a periphery of the base wall, and wherein the side wall cooperates with the first heat shield to form an insulating area between an inner surface of the injector heat shield and the injector mount area.

7. The exhaust component assembly according to claim 6 wherein the injector is mounted to the first exhaust component at the injector mount area and is configured to inject a fluid into the internal cavity to mix with the engine exhaust gases.

8. The exhaust component assembly according to claim 2 wherein the second exhaust component comprises at least one sensor, and wherein the at least one mount area comprises a sensor mount area with the protrusion being configured to mount a sensor to the outer housing, and wherein the secondary heat shield comprises a sensor heat shield that includes a base wall with at least one shield opening for the sensor and a side wall extending away from the base wall about a periphery of the base wall, and wherein the side wall cooperates with the first heat shield to form an insulating area between an inner surface of the sensor heat shield and an the sensor mount area.

9. The exhaust component assembly according to claim 8 wherein the sensor is mounted to the first exhaust component at the sensor mount area and is configured to sense at least one predetermined exhaust system characteristic.

10. The exhaust component assembly according to claim 2 wherein the secondary heat shield comprises insulating material that is positioned between a distal end of the protrusion and an inner surface of the first heat shield.

11. The exhaust component assembly according to claim 2 wherein the second exhaust component comprises at least one of an injector and a sensor, and wherein the secondary heat shield is positioned to at least partially overlap the open area of the first heat shield at the mount area, and including a mounting structure to attach the first heat shield to the exhaust component housing, wherein the mounting structure comprises a primary insulator located between an outer surface of the exhaust component housing an inner surface of the first heat shield and one or more secondary insulators positioned adjacent opposing sides of the primary insulator.

12. The exhaust component assembly according to claim 1 wherein the outer housing defines a center axis, and wherein the first heat shield comprises shield portions that are positioned to extend around the center axis and cooperate with the secondary heat shield to surround an outer peripheral surface of the outer housing.

13. The exhaust component assembly according to claim 1 wherein the outer housing defines an internal mixing cavity, and including positioning an inlet baffle within the internal cavity near an upstream end of the outer housing, positioning an outlet baffle within the internal cavity near a downstream end of the outer housing, and wherein the mount area is positioned axially between the inlet and outlet baffles.

14. A mixer assembly for a vehicle exhaust system comprising:
   a mixer housing having an outer surface and an inner surface that defines an internal cavity for engine exhaust gases;
   at least one mount area comprising at least one protrusion that extends outwardly of the outer surface of the mixer housing;
   a primary heat shield attached to substantially surround the mixer housing, the primary heat shield including at least one open area at the mount area; and
   a secondary heat shield positioned relative to the primary heat shield to at least partially cover the mount area, and wherein the secondary heat shield includes at least one opening that is aligned with the at least one open area and the at least one protrusion.

15. The mixer assembly according to claim 14 wherein the secondary heat shield comprises a base wall that includes the at least one opening and a side wall extending away from the base wall about a periphery of the base wall, and wherein the side wall at least partially overlaps the open area in the primary heat shield to form an insulating area between an inner surface of the secondary heat shield and an outer surface of the mount area.

16. The mixer assembly according to claim 15 including an injector positioned at the opening in the secondary heat shield, and wherein the protrusion mounts the injector to the mixer housing such that the injector can inject a fluid into the internal cavity to mix with the engine exhaust gases.

17. The mixer assembly according to claim 15 including a sensor positioned at the opening in the secondary heat shield, and wherein the protrusion mounts the sensor to the mixer housing such that the sensor can sense at least one predetermined exhaust system characteristic.

18. The mixer assembly according to claim 15 wherein the at least one mount area comprises at least an injector mount area and a sensor mount area, and wherein the secondary heat shield comprises a first secondary heat shield portion mounted to the primary heat shield at the injector mount area and a second secondary heat shield portion separately mounted to the primary heat shield at the sensor mount area.

19. The mixer assembly according to claim 15 wherein the secondary heat shield comprises insulating material that is positioned between a distal end of the protrusion and an inner surface of the primary heat shield.

20. The mixer assembly according to claim 15 wherein the primary heat shield includes one or more predefined localized hot spot areas that are subject to higher operating temperatures than a remaining area of the primary heat shield, and including additional insulating material attached to each predefined localized hot spot area.

21. The mixer assembly according to claim 14 wherein the mixer housing defines a center axis, and wherein the primary heat shield comprises shield portions that are positioned to extend around the center axis and cooperate with the secondary heat shield to surround an outer peripheral surface of the mixer housing.

22. The mixer assembly according to claim 14 wherein the mixer housing defines an internal mixing cavity, and including positioning an inlet baffle within the internal cavity near an upstream end of the outer housing, positioning an outlet baffle within the internal cavity near a downstream end of the outer housing, and wherein the at least one opening is positioned axially between the inlet and outlet baffles.

23. A method of assembling a heat shield to an outer housing of mixer comprising the steps of:
   providing at least one protruding mount area that extends outwardly of the outer housing;
   attaching a primary heat shield to substantially surround the outer housing of the mixer, the primary heat shield including at least one open area that is aligned with the mount area; and
   at least partially covering the mount area with a secondary heat shield that includes at least one opening that is aligned with the open area of the primary heat shield.

24. The method according to claim 23 wherein the at least one protruding mount area comprises at least one of an injector mount area and a sensor mount area, and wherein the secondary heat shield comprises a base wall that includes the at least one opening and a side wall extending away from the base wall about a periphery of the base wall, and including at least partially overlapping the open area in of the primary heat shield with the secondary heat shield to form an insulating area between an inner surface of the secondary heat shield and the outer surface of the at least one protruding mount area.

25. The method according to claim 23 wherein the secondary heat shield at least partially overlaps the first heat shield.

26. The method according to claim 23 wherein the primary heat shield comprises a pair of C-shaped shield portions, and including positioning the pair of C-shaped shield portions to cooperate with the secondary heat shield to surround the outer housing.

27. The method according to claim 23 wherein the outer housing defines an internal mixing cavity, and including positioning an inlet baffle within the internal cavity near an upstream end of the outer housing, positioning an outlet baffle within the internal cavity near a downstream end of the outer housing, and configuring the at least one opening to receive an injector configured to inject fluid into the internal cavity between the inlet and outlet baffles.

* * * * *